United States Patent
Erdemir et al.

(10) Patent No.: US 11,475,686 B2
(45) Date of Patent: Oct. 18, 2022

(54) EXTRACTING DATA FROM TABLES DETECTED IN ELECTRONIC DOCUMENTS

(71) Applicant: Oracle International Corporation, Redwood Shores, CA (US)

(72) Inventors: Erhan Erdemir, Plymouth, MN (US); Kenneth James Peterka, Minong, MN (US)

(73) Assignee: Oracle International Corporation, Redwood Shores, CA (US)

( * ) Notice: Subject to any disclaimer, the term of this patent is extended or adjusted under 35 U.S.C. 154(b) by 8 days.

(21) Appl. No.: 16/778,147

(22) Filed: Jan. 31, 2020

(65) Prior Publication Data

US 2021/0240973 A1 Aug. 5, 2021

(51) Int. Cl.
*G06V 30/412* (2022.01)
*G06F 40/30* (2020.01)
*G06F 40/289* (2020.01)
*G06F 40/177* (2020.01)

(52) U.S. Cl.
CPC .......... *G06V 30/412* (2022.01); *G06F 40/177* (2020.01); *G06F 40/289* (2020.01); *G06F 40/30* (2020.01)

(58) Field of Classification Search
CPC ........... G06K 9/00449; G06K 9/00463; G06K 9/00469; G06F 40/289; G06F 40/30; G06F 40/177; G06F 16/258; G06F 16/86; G06V 30/412
See application file for complete search history.

(56) References Cited

U.S. PATENT DOCUMENTS

| | | | |
|---|---|---|---|
| 5,737,442 A | 4/1998 | Alam | |
| 5,784,487 A | 7/1998 | Cooperman | |
| 6,175,844 B1 | 1/2001 | Stolin | |
| 6,336,124 B1 | 1/2002 | Alam et al. | |
| 6,405,175 B1 | 6/2002 | Ng | |
| 7,970,213 B1 | 6/2011 | Ruzon et al. | |
| 8,249,356 B1 | 8/2012 | Smith | |
| 9,495,347 B2 | 11/2016 | Stadermann et al. | |
| 9,613,267 B2 | 4/2017 | Dejean et al. | |
| 9,720,896 B1 * | 8/2017 | Wu | G06F 40/143 |
| 10,241,992 B1 | 3/2019 | Middendorf et al. | |
| 10,706,322 B1 | 7/2020 | Yang et al. | |
| 10,878,195 B2 * | 12/2020 | Duta | G06F 16/3344 |

(Continued)

FOREIGN PATENT DOCUMENTS

| | | |
|---|---|---|
| CN | 104881488 B | 4/2017 |
| CN | 106802884 A | 6/2017 |
| EP | 1739574 B1 | 9/2007 |

OTHER PUBLICATIONS

Clausner et al., "The Significance of Reading Order in Document Recognition and its Evaluation", 12th International Conference on Document Analysis and Recognition, 2013, pp. 688-692.

(Continued)

*Primary Examiner* — Nicholas Ulrich
(74) *Attorney, Agent, or Firm* — Invoke

(57) ABSTRACT

The embodiments disclosed herein relate to extracting table data from an electronic document. Tables are detected based on identification of the column headers, of the table, that correspond to known fields. Once a table is detected, values corresponding to the column headers are extracted and stored in association with the known fields.

22 Claims, 7 Drawing Sheets

(56) References Cited

U.S. PATENT DOCUMENTS

| | | |
|---|---|---|
| 2006/0271847 A1 | 11/2006 | Meunier |
| 2013/0318426 A1 | 11/2013 | Shu et al. |
| 2014/0064618 A1 | 3/2014 | Janssen, Jr. |
| 2016/0104077 A1 | 4/2016 | Jackson et al. |
| 2017/0220859 A1 | 8/2017 | Grams |
| 2018/0373952 A1 | 12/2018 | Bui et al. |
| 2019/0005322 A1 | 1/2019 | Tripathi et al. |
| 2019/0171704 A1* | 6/2019 | Buisson ............. G06K 9/00449 |
| 2020/0050845 A1 | 2/2020 | Foncubierta et al. |
| 2020/0117944 A1 | 4/2020 | Duta |
| 2020/0311410 A1 | 10/2020 | Prasad et al. |
| 2021/0019287 A1* | 1/2021 | Prasad ................. G06K 9/6256 |

OTHER PUBLICATIONS

Klampfl et al., "A Comparison of Two Unsupervised Table Recognition Methods from Digital Scientific Articles", D-Lib Magazine, vol. 20, No. 11/12, 2014, 13 pages.

Liu et al., "TableSeer: Automatic Table Extraction, Search, and Understanding", Department of Information Sciences and Technology, 2009, 171 pages.

Pan et al., "Document layout analysis and reading order determination for a reading robot", TENCON 2010—2010 IEEE Region 10 Conference, 2010, 2 pages.

Perez-Arriaga et al., "TAO: System for Table Detection and Extraction from PDF Documents", Proceedings of the Twenty-Ninth International Florida Artificial Intelligence Research Society Conference, 2016, pp. 591-596.

\* cited by examiner

FIG. 5

EXTRACTING DATA FROM TABLES DETECTED IN ELECTRONIC DOCUMENTS

TECHNICAL FIELD

The present disclosure relates to data extraction. Specifically, the disclosure is directed to detecting tables in electronic documents and extracting data from the detected tables.

BACKGROUND

There are many instances in which information needs to be extracted from an electronic document. This can include instances in which a paper document is scanned or photographed and made into an electronic format. This can also include instances in which a document is received in a generic electronic format or image-based format (such as PDF or JPG).

Optical character recognition (OCR) is a method of processing an image or document to find text within the image or document. OCR converts images of typed, handwritten, or printed text into machine-encoded text. One may desire to take information from the electronic document or image file and convert it into machine-encoded data so that the machine-encoded data can be electronically edited, searched, stored more compactly, displayed on-line, or used in machine processes. Once machine-encoded, data can be converted into a format that is more easily capable of processing, such as a format readable by spreadsheets, accounting programs, and the like.

OCR is widely used for the conversion of text documents (such as books, newspapers, magazines, and the like). OCR extracts text line-by-line from left to right. As a result, conventional OCR techniques work well for extracting data from electronic documents that primarily include text in paragraph forms. The extracted paragraphs can be stored or presented in an intelligible manner.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 is a diagram illustrating an example table, in accordance with one or more embodiments;

DETAILED DESCRIPTION

Figure 1:
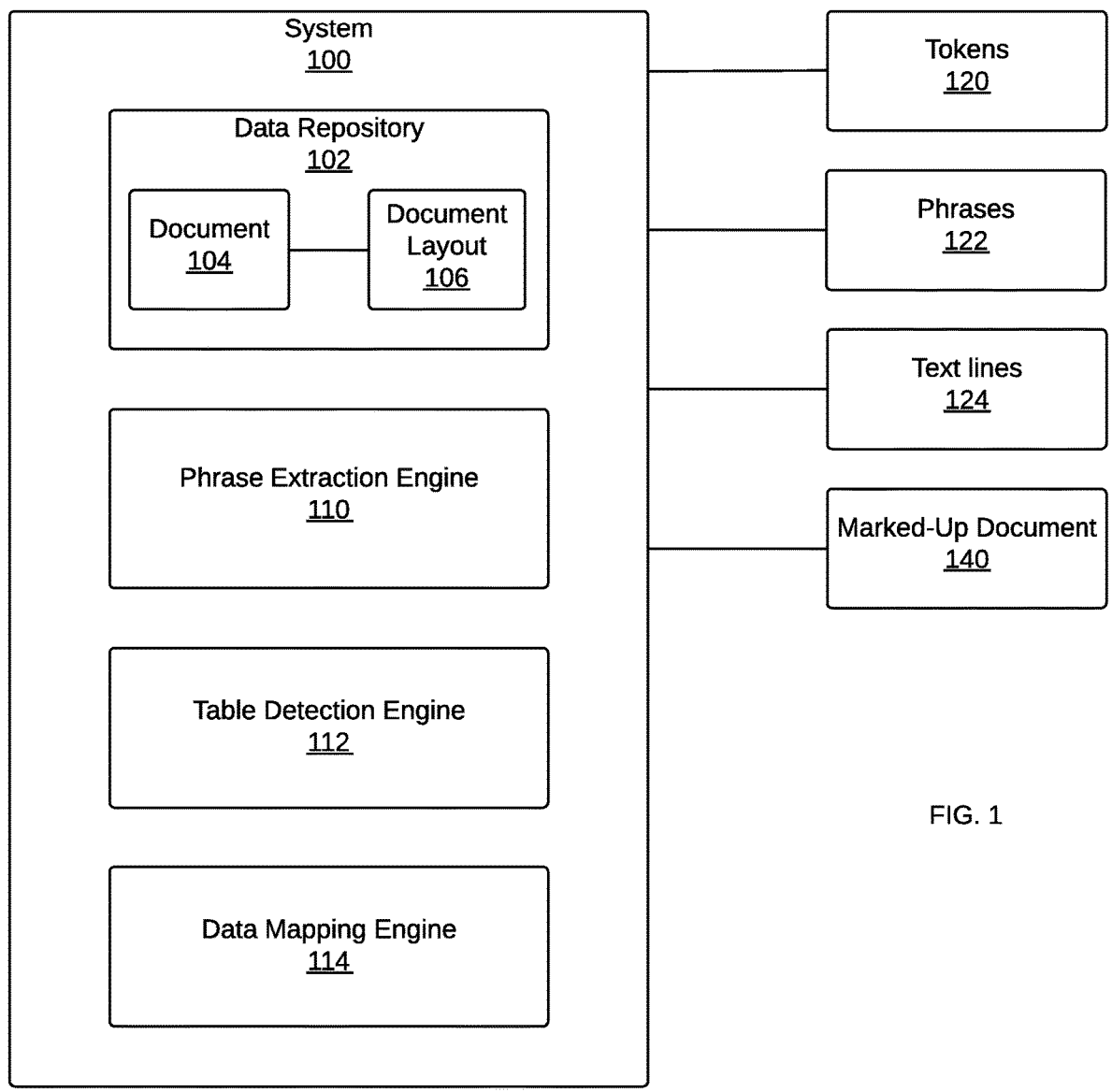
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. TABLE DATA EXTRACTION SYSTEM
3. EXTRACTING AND MERGING PHRASES
4. EXTRACTING TABLE DATA
5. BOUNDING BOXES
6. EXAMPLE TABLE
7. HARDWARE OVERVIEW

1. General Overview

One or more embodiments extract data from tables detected within an electronic document. The system analyzes phrases within the electronic document to identify phrase characteristics corresponding to column headers, located at the start of a table in an electronic document. In an example, the system detects phrases that are (a) on a same text line and (b) correspond to fields in a set of known fields. The phrases with these particular set of characteristics are identified as column headers of columns within a table in the electronic document.

Some embodiments learn and update operations for detecting column headers within a table of an electronic document. A machine-learning model is trained to identify column headers of a table based on patterns detected within a sample corpus of documents. The column headers, in tables within the sample corpus of documents, are previously labeled as column headers. The system determines the characteristics of the labeled column headers and characteristics of content around the labeled column headers. The characteristics are learned and searched-for in later operations for detecting column headers within target electronic documents.

In an example, a set of invoices is used to train a machine-learning model. The machine-learning model learns that the first four lines of each invoice includes invoice header information such as a billing entity and a bill-to entity. The machine-learning model then ignores the first four lines of any target electronic document that is being analyzed. The machine-learning model further learns that any table included subsequent to the header information has a particular format. The particular format of each table may include, for example, one or more header rows with only alphabetical characters followed by line item rows which include both alphabetical characters and numerical characters. While classification techniques based on the inclusion of numerical characters is described in relation to machine-learning examples, such classification techniques may also be statically defined for execution by a data extraction system.

Some column headers in a particular text line, as referenced above, continue to one or more subsequent text lines. The system determines whether a text line, subsequent to a first text line determined to include a column header, continues the column headers in the first text line. In an example, the system determines that the second text line continues one or more column headers based on the second text line not including any digits. Digits within a text line, such as in an invoice, generally indicate that the text line corresponds to a line item. The digits may represent a quantity or a price.

In another example, the system determines that the second text line continues one or more column headers based on the second text line being within a threshold distance of the first text line with column headers. The system may be trained using a machine-learning model to define a maximum vertical space between text lines that correspond to a same column header. If the vertical spacing between the first text line (determined to correspond to the column header) and the second text line exceeds the maximum vertical space, the second text line is determined to correspond to a line item rather than a continuation of column headers in the first text line.

Some embodiments extract data as a value corresponding to a column header based on a position of the value relative to the position of the column header within the electronic document. The system determines that a value corresponds to a particular column header if (a) the horizontal position of the value overlaps at least in part with the horizontal position of a column corresponding to the particular column header within the electronic document, (b) the vertical position of the value is below the vertical position of the particular column header within the electronic document, and (c) the vertical position of the value is within a threshold distance of the particular column header or within a threshold distance of another value that has been determined to correspond to the particular column header. A value, corresponding to a particular column header, may be stored in association with a field corresponding to the particular column header.

One or more embodiments described in this Specification and/or recited in the claims may not be included in the General Overview section.

2. Table Data Extraction System

FIG. 1 is a block diagram that illustrates components of a computing system, in accordance with one or more embodiments. System 100 includes components for detecting a table within an electronic document and extracting data from the detected table. In one or more embodiments, system 100 may include more or fewer components than the components illustrated in FIG. 1. The components illustrated in FIG. 1 may be local or remote from each other. The components may be implemented in software and/or hardware. Each component may be distributed over multiple applications and/or machines. Multiple components may be combined into one application and/or machine. Operations described with respect to one component may instead be performed by another component.

System 100 includes one or more data repositories 102. A data repository is any type of storage unit and/or device (e.g., a file system, database, collection of tables, or any other storage mechanism) for storing data. Further, data repository 102 may include multiple different data storage units and/or devices. The multiple different storage units and/or devices may or may not be of the same type or located at the same physical site.

Data repository 102 may be implemented or may execute on the same computing system as phrase extraction engine 110. Alternatively, or additionally, data repository 102 may be implemented or executed on a separate computing system than phrase extraction engine 110. Data repository 102 may be communicatively coupled to phrase extraction engine 110 via a direct connection or via a network.

Document 104 may be obtained by the system 100 from the data repository 102 or from another source. The document 104 may be received using an electronic transmission such as email, instant messaging, or short message system. The document 104 can be in any type of electronic format. Common electronic formats include portable document format ("PDF"), JPEG, TIFF, PNG, DOC, and DOCX. Document 104 may be converted to the electronic format from a non-electronic format. For example, document 104 may have originally been in paper form. Document 104 may be converted to an electronic format using a scanner, a camera, or a camcorder. In some embodiments, the document 104 may have been created in an electronic format and received by the system in an electronic format. Documents may include content corresponding to receipts, invoices, income statements, balance sheets, cash flow statements, estimates, and tables.

Phrase extraction engine 110 corresponds to hardware and/or software configured to extract data from document 104. Phrase extraction engine 110 may include OCR components to detect text within the document 104. Phrase extraction engine 110 may be used to extract tokens 120, text lines 124, and phrases 122 from the document 104.

A text line 124 refers to a set of characters that are positioned approximately along a single horizontal line. Accordingly, characters on the same text line 124 have overlapping vertical positions within the electronic document.

A token 120 corresponds to one or more of contiguous characters in a text line 124. A token 120 may include letters or digits or a combination of both. Tokens may be separated from one another by any number of spaces. Tokens may also be separated by one another from another delimiter such as a colon.

A phrase 122 corresponds to a set of tokens that is intended to describe a single element (e.g., a label or a value). Examples of phrases include "Invoice Number", "Total Cost", and "three-legged blue stool." A phrase 122 may also include a single token. For example, "Description" may be referred to as a phrase 122. A phrase 122 may include tokens across multiple text lines 124. In an example, a shipping address includes the street address on a first text line, and the city, state, and zip code on a second text line. Both lines of the shipping address may be identified as belonging to a single phrase 122.

A table detection engine 112 corresponds to hardware and/or software configured to detect tables within an electronic document. The table detection engine 112 detects characteristics of phrases that signal the inclusion of a table within the electronic document. The characteristics of phrases, that are determined and analyzed by the table detection engine 112, may include a position of the phrases and content of the phrases. The document layout 106, as referred to herein, includes a position of a phrase within the document 104. The document layout 106 may further include a distance of phrase from other phrases within the document 104. The document layout 106 may define bounding boxes for any phrase or token within the document 104. A bounding box is not necessarily drawn within document 104 itself. A bounding box is defined by a set of (x and y) coordinates which represent a box such that the box if drawn would enclose the corresponding phrase or content. The (x and y) coordinates of the bounding box are used for determining or representing a position and a distance with respect to a corresponding phrase. Bounding boxes are further described below with reference to FIG. 4.

A horizontal position of a phrase may be defined by a horizontal range (X1 to X2) corresponding approximately to the width of the phrase itself, or a width of bounding box that surrounds the phrase. Alternatively, or in addition, a horizontal position of a phrase may be defined by a particular point such as a left-most x-coordinate corresponding to the phrase itself or a left-most x-coordinate corresponding to a bounding box of the phrase. A vertical position of a phrase may be defined by a vertical range (Y1 to Y2) corresponding approximately to the vertical size of characters of the phrase itself, or a height of a bounding box that surrounds the phrase. Alternatively, or in addition, a vertical position of a phrase may be defined by a particular point such as a highest y-coordinate corresponding to the phrase itself or a highest y-coordinate corresponding to a bounding box of the phrase.

A data mapping engine 114 corresponds to hardware and/or software configured to map values extracted from a table to one of a set of known fields. The data mapping engine maps detected column headers to known fields using either an exact match or a fuzzy match. An exact match involves a detected column header exactly matching a particular database field. A fuzzy match involves a detected column header being associated with a particular database field based on a known relationship between terms. As an example, a detected column header "Quantity" may be mapped to an exactly matching, database field "Quantity." In addition, a column header "Qty" may be mapped to the database field "Quantity" based on a fuzzy match between "Qty" and "Quantity". In this example, the system relies on stored information indicating a relationship between "Qty" and "Quantity". This relationship may be, for example, explicitly noted via user input. The relationship may be learned by the system via training on a set of documents where "Qty" was mapped to or labeled as "Quantity". The data mapping engine 114 may also determine relationships based on dictionary-defined synonyms.

Marked-up document 140 is a modified version of document 104. Marked-up document 140 may correspond to an annotated version of document 104. The annotations may include, for example, labels identifying a set of data as a table, labels identifying column headers of the table, and labels identifying values within the table. Marked-up document 140 may include content, from document 104, in an optimized reading order. The content may be represented in a format that is more readily usable by other computerized applications. Marked-up document 140 may be generated using a markup language such as eXtensible Markup Language ("XML") or other suitable markup language. Marked-up document 140 may be in a proprietary format for use with spreadsheets, databases, or other application format.

System components as described above may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a server, a web server, a network policy server, a mainframe, a television, a content receiver, a set-top box, a printer, a mobile handset, a smartphone, and/or a personal digital assistant ("PDA").

3. Extracting and Merging Phrases

Figure 2A:
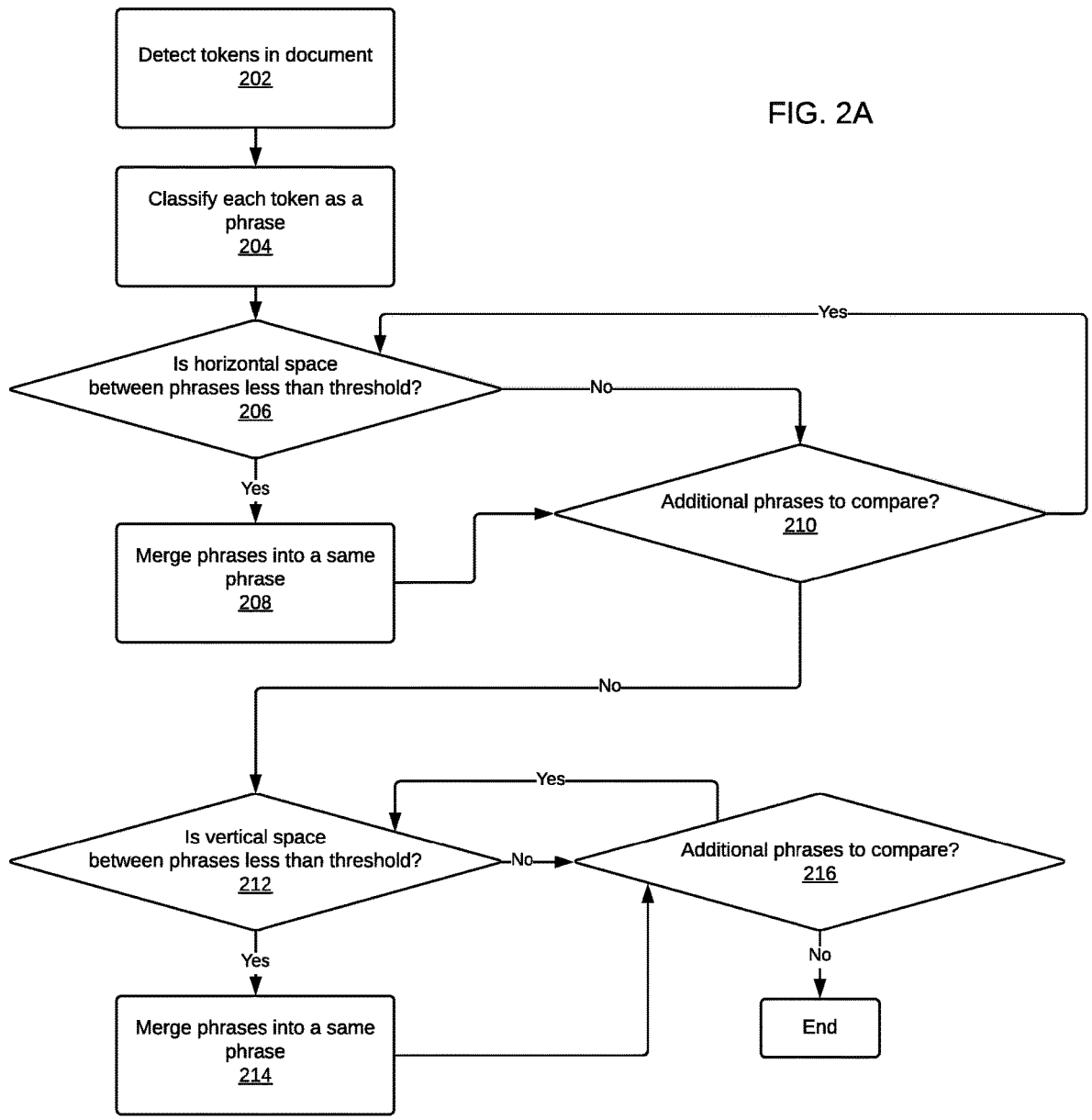
FIGS. 2A and 2B is a flow diagram that illustrates the forming of phrases, in accordance with one or more embodiments.
Figure 2B:
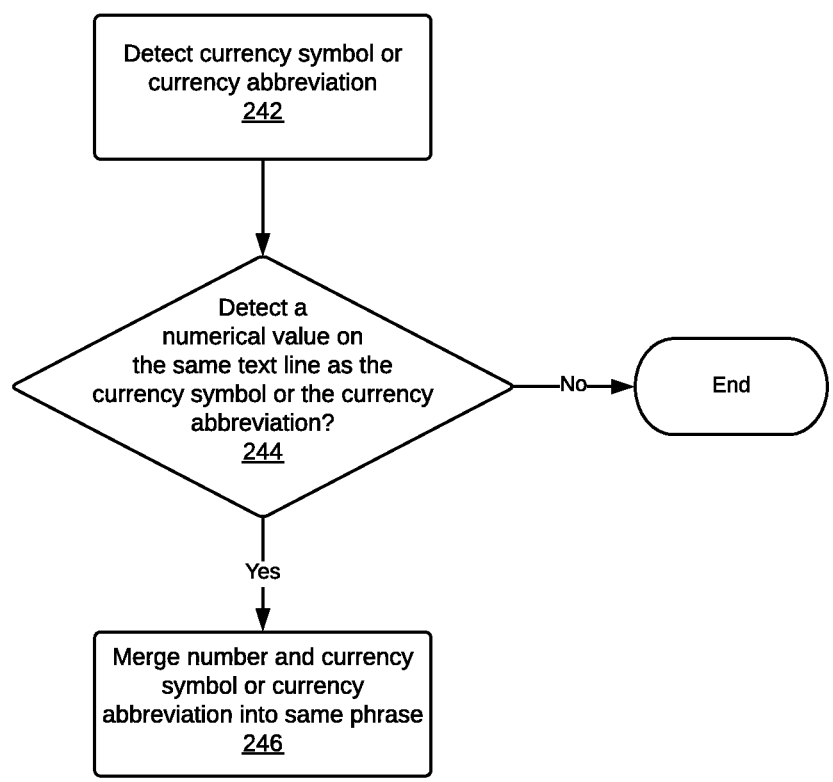

FIGS. 2A-2B illustrate operations for extracting and merging phrases in accordance with one or more embodiments. One or more operations illustrated in FIGS. 2A-2B may be modified, rearranged, or omitted altogether. Accordingly, the particular sequence of operations illustrated in FIGS. 2A-2B should not be construed as limiting the scope of one or more embodiments.

Initially, the system detects tokens in a document in accordance with an embodiment (Operation 202). Detecting tokens includes detecting words or a contiguous set of characters within the document. A space between a first set of characters and a second set of characters may be used to partition the characters into separate tokens. The first set of characters representing a first word may be classified as a first token. The second set of characters representing a second word may be classified as a second token that is different from the first token. OCR techniques may be used to identify words or contiguous sets of characters within the document. A set of characters may be assigned to a same token based on similar characteristics. As an example, character width and character height of each of a set of characters may be compared to determine whether the set of characters may be assigned to a same token. If the absolute or percentage difference in character width or character height exceeds a threshold value, the characters may be assigned to different tokens.

In an embodiment, each token may be classified as a phrase or considered a phrase (Operation 204) for the purpose of evaluating phrase mergers as described in operations 206-216. The operations described below in relation to phrase mergers may first be applied to merge tokens into a single token prior to the phrase mergers.

Sets of two or more phrases may be merged together to form a single phrase. In an embodiment, the system merges sets of phrases together if the sets of phrases meet a merging criteria. As an example, phrases are merged together if the would-be merged phrase matches a known label. Consecutive phrases "Invoice" and "Number" are merged together in response to determining that "Invoice Number" is a known label that is included in a listing of known labels. A merging criteria may require that the phrases have the same font or same font size.

In an example, phrases may be merged together into a single phrase based on a horizontal space between the phrases or a vertical space between the phrases. Specifically, if the horizontal space between phrases is less than a threshold (Operation 206), then the phrases are merged into a same phrase (Operation 208). Similarly, if the vertical space between phrases is less than a threshold (Operation 212), then the phrases are merged into a same phrase (Operation 214). The thresholds may be determined as a function of the height and/or width of the characters within the phrases. The merging operations are repeated if there are additional pairs or groups of phrases to evaluate for mergers (Operations 210 and 216).

In an embodiment, consecutive phrases may be merged together if the resulting merged phrase corresponds to a known database field. The combination of various groups of consecutive phrases may be tested to determine whether the consecutive phrases should be merged into a single phrase. As an example, "Invoice" and "No" may be merged together if "Invoice No" is one of a set of known database fields. "Invoice" and "No" may be merged together if "Invoice No" can be mapped to any known database field, such as "Invoice Number".

FIG. 2B illustrates operations for merging a currency symbol or currency abbreviation with a corresponding currency value into a same phrase. The system detects a currency symbol or currency abbreviation (Operation 242). For example, the system detects the currency symbol "$", or an abbreviation "USD" for United States Dollar. Alternatively, or additionally, the system may also detect the currency written in complete form (e.g., "Yen"). Detecting the currency symbol or the currency abbreviation triggers a search for numerical values to the right and/or to the left of the detected currency symbol or currency abbreviation. The search for numerical values may be, but is not necessarily, limited to numerical values in the same text line as the currency symbol or currency abbreviation. The search for numerical values may be, but is not necessarily, limited to a threshold distance from the detected currency symbol or the currency abbreviation. Numerical values that are separated from the currency symbol or currency abbreviation by another intervening phrase do not qualify for the merging operation. If a qualifying numerical value is detected (Operation 244), the numerical value is merged with the currency symbol or currency abbreviation into the same phrase (Operation 246). If a numerical value is identified on each of the right and left sides of the currency symbol or currency description, a value selection process may be executed. The value that is the closest may be selected for merging with the currency symbol or currency description. Alternatively, a value is selected based on training using an appropriate sample set. The training dictates the standard position of the numerical value in relation to the currency symbol or currency abbreviation. As an example, the system may be trained using marked-up sample invoices to select the numerical value to the right of a currency symbol for all invoices from the company Closets and More.

4. Extracting Table Data

Figure 3:
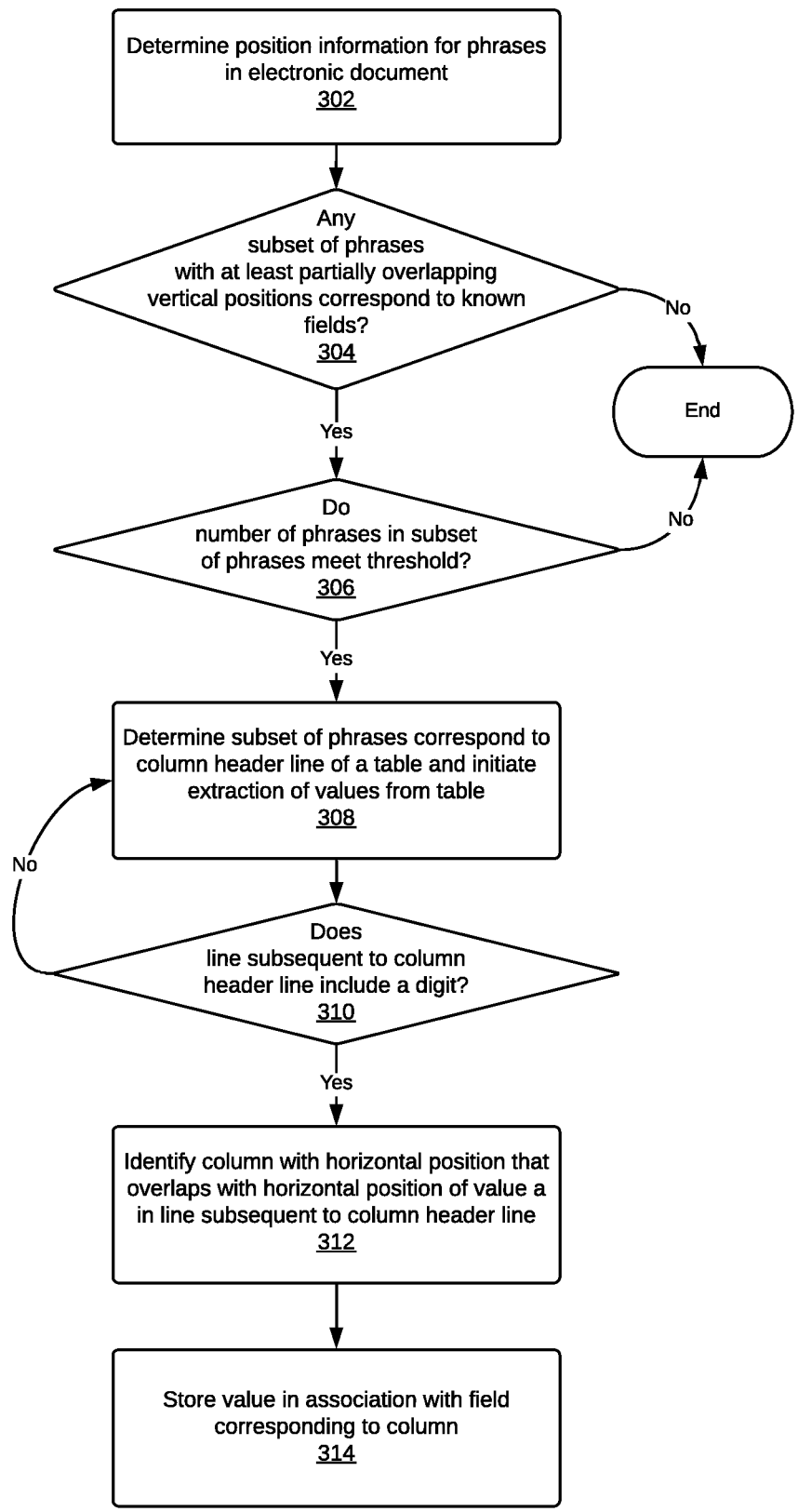
FIG. 3 is a flow diagram that illustrates the extraction of table data, in accordance with one or more embodiments.

FIG. 3 illustrates operations for extracting table data in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the system determines position information for phrases within the electronic document (Operation 302). The position information for the phrases may be determined subsequent to merging operations as described above in relation to FIGS. 2A and 2B. The position information may be determined based on the coordinates of the text of the phrase itself or the coordinates of a bounding box surrounding the phrase. In an example, a bottom left corner of a page in an electronic document has the (x,y) coordinates (0,0). Using ½ inches as a unit of measurement, in this example, the system determines a position of a bounding box for a phrase as (332, 423) to (430, 383). The horizontal position of the bounding box ranges from 332 (left) to 430 (right). The vertical position ranges from 423 (top) to 383 (bottom).

The system determines whether any of a subset of phrases with at least partially overlapping vertical positions correspond to known fields (Operation 304). Two or more phrases have at least partially overlapping vertical positions when the range of vertical positions, corresponding to the two or more phrases, at least partially overlaps. As an example, a vertical range of 423 to 383 overlaps with another vertical range from 400 to 450 due to a partially overlapping range 400 to 423.

Phrases with partially overlapping vertical positions correspond to phrases that are each, at least partially, on a same text line. Partially overlapping vertical positions may be a result of all phrases of the subset of phrases being fully contained on the same text line. Partially overlapping vertical positions may be a result of at least some text from each of the phrases of the subset of phrases being positioned on a same text line. A phrase which extends multiple lines may have a partially overlapping vertical position with a phrase that is fully contained within a single text line.

The system compares each of the subset of phrases, with at least partially overlapping vertical positions, to a set of known fields. In an example, the phrases are compared to known fields in an invoice management database. The subset of phrases within a document with at least partially overlapping vertical positions include Item No., Description, Qty, Unit Cost, and Total. The known fields within the invoice management system include Item Number, Description, Quantity, Unit Price, Sub-Total, Total, Customer Name, Customer Mailing Address, Customer Email Address, and Customer Phone Number. Comparison of the subset of phrases detected in the electronic document with the known fields within the invoice management system yields the following mapping:

TABLE 1

| Phrases in electronic document | Known fields in invoice management system |
|---|---|
| Item No. | Item Number |
| Description | Description |
| Qty | Quantity |
| Unit Cost | Unit Price |
| Total | Sub-Total |

As illustrated above in Table 1, matching phrases in the electronic document with known fields in the invoice management system includes, as non-limiting examples, matching based on exact text, synonym matches, and abbreviation matches.

The number of matched phrases is compared to a threshold (Operation 306). If a minimum number of matched phrases is not found, then the subset of phrases is determined not to correspond to a column header line of a table. If the minimum number of matched phrases is found, then the subset of phrases is determined to correspond to a column header line of a table (Operation 308). A column header line may be identified based on a match between any number of phrases and corresponding known fields, without the use of a specific threshold as described in Operation 306. Identification of a column header line, as described above, is used for identification of a table, in the electronic document, for data extraction. In an embodiment, the column header line as a whole, specific column headers within the column header line, or the table itself may be tagged with corresponding labels.

Once a column header line of a table is detected, the system initiates operations to extract values from the table. Lines subsequent to the detected column header line may correspond to one or more additional column header lines, or may correspond to values that need to be extracted. The system determines whether the subsequent line(s) continue the column headers or correspond to values to-be-extracted based, for example, on the inclusion or exclusion of numerical characters, i.e., digits. If a subsequent text line only includes alphabetical characters and no numerical characters, then the system determines that the subsequent text line continues the column headers in the first column header line.

If the subsequent text line includes numerical characters, then the system determines that the subsequent text line includes values corresponding to the column. Numerical characters may be used, for example, for representing currency or quantities in invoices. A text line, subsequent to a column header line, that includes numerical characters likely corresponds to a line item within the invoice.

The system identifies values corresponding to a particular column that are positioned at (a) a vertical position below the vertical position of the particular column header and (b) a horizontal position that at least partially overlaps with the horizontal position of the particular column (Operation 312).

The horizontal position (horizontal range) of the column, used for detecting values within the column, may initially correspond to the horizontal position of the column header. However, the horizontal position of the column may be expanded to include any horizontal position corresponding to at least one value determined to correspond to the column.

The system may further validate that the value corresponds to the particular column by ensuring that the value is part of the table associated to the column (and not subsequent to the table). A target value may be determined to be part of the table based on a vertical space (a) between the target value and the column header (in case the value is the first value below the column header), or (b) between the target value and another value positioned above the target value (in case the value is not the first value below the column header). If the vertical space is below a maximum space threshold, the value is determined to correspond to the particular column. The value is then stored in association with the field that corresponds to the particular column (Operation 314). Storing the value may include formatting, restructuring, or otherwise modifying the value. In an example, a function may be applied to the extracted value and the result may be stored in a database rather than the value itself.

In an embodiment, the system extracts values that are split across multiple lines in an electronic document. A first text line corresponding to any particular line item may be referred to herein as a primary line. A second or subsequent text line corresponding to any particular line item may be referred to as a secondary line. When analyzing a document that includes values split across multiple lines, the system analyzes text in each line subsequent to the column header line to determine whether the text corresponds to a new line item (and new value), or whether the text includes a secondary line that continues a value from a preceding text line. In one example, the system may identify text in a text line as corresponding to a primary line of a new line item in response to determining that text is included in the text line in relation to each column header. If text is only included in relation to some of the column headers, the text is determined to be a secondary line that continues the value in the preceding text line. In an embodiment, the alignment (left, right, or center) of text and/or indentation of text is used to determine whether the text corresponds to (a) a primary line of a new line item, (b) a secondary line of a line item associated with the preceding line, or (c) text outside of the table. The system's classification of text lines is based on the patterns found within training data. In an example, the training documents include table data that is always center-aligned within a column and non-table data that is left-aligned on each page. Based on the training documents, the system may be trained to identify text that is center-aligned within columns as table data and text that is left-aligned on the page as non-table data. In another example, the training documents may include left-aligned values in secondary lines that are indented in relation to the left-aligned values in primary lines. Based on the training documents, the system may be trained to identify a text line as corresponding to a primary line or a secondary line based on the indentation schema determined for values within the column.

In an embodiment, the system extracts values from a table that is split across two or more pages of a document. The system may detect the end of a page while extracting values from a table and continue to search for additional line items on the next page. In an example, the table split across multiple pages includes a same column header line on each page. When an identical column header line is detected on multiple pages, extraction information determined for one page with a first portion of the table may be used for extracting values from a second portion of the table on another page. The x-coordinate range, used for extracting values for a column on a first page, may be used for extracting values from a corresponding column on the second page with the same column header. The values extracted from corresponding columns on different pages may be stored in association with the same field. Accordingly, data extracted from portions of a table that are on different pages may be merged together in the same data set.

One or more embodiments assign fields to values within non-labeled columns. Values within non-labeled columns are detected as values that (a) have a vertical position that at least partially overlaps other values that have been extracted and stored in accordance with the operations described above and (b) have a horizontal position that does not overlap with any phrase in a column header line that has been mapped to a known field. The column header may be entirely missing. Alternatively, the column header may be an unrecognized column header that was not successfully mapped to a known field. In this scenario, the system determines mathematical relationships between the values of labeled columns and the non-labeled column/unrecognized label column. In an example, the system determines that values in a first column multiplied by values in a second column equal values in a third column. The first column is unlabeled, the second column is labeled unit price and the third column is labeled sub-total. The system determines that the data previously stored in association with the three fields in the database (Quantity, Unit Price, and Sub-total) have the same relationship whereby for any given record, the quantity multiplied by unit price equals the sub-total. Based on (a) the shared mathematical relationship and (b) the mapping of Unit Price and Sub-Total across the electronic document and the database, the system determines that the first unlabeled column corresponds to Quantity. The values from the first unlabeled column are then stored in association with the Quantity field in the database.

5. Bounding Boxes

A bounding box 420 is an area surrounding the phrase 410 (or a group of phrases). The bounding box fully encloses each of the characters in the phrase(s). In some embodiments, the size of the bounding box can be dependent on a size of phrase 410, with a larger phrase resulting in a larger bounding box 420.

The top-left corner of the bounding box is indicated by element 430. The top-left corner can be defined in terms of x and y coordinates, as will be described below.

Origin 440 defines a zero point of the document. In the embodiment shown in FIG. 4, the origin 440 can be set at or near the top-left corner of the document. The x-axis is defined as being in a horizontal direction, with the numbers increasing in a rightward direction. The y-axis is defined as being in a vertical direction, with the numbers increasing in a downward direction. Defining the origin 440 and x and y coordinates in this manner allows all coordinates in the document to be positive. The scale of the coordinates can be one of a variety of different scales. For example, if a document is scanned, the dots per inch of the scan may be used to set the scale of the coordinates. A scan of 100 dots per inch means that a letter sized document that is 8.5 inches wide and 11 inches long has 850 x-coordinates and 1100 y-coordinates. In some embodiments, the x-coordinates and y-coordinates are floating point numbers, allowing such embodiments to be even more precise in setting forth locations.

Width 450 is a width of the phrase 410, including bounding box 420.

Height 460 is a height of the phrase 410, including bounding box 420. Width 450 and height 460 can be used in determining grouping of phrases, as described above.

Figure 4:
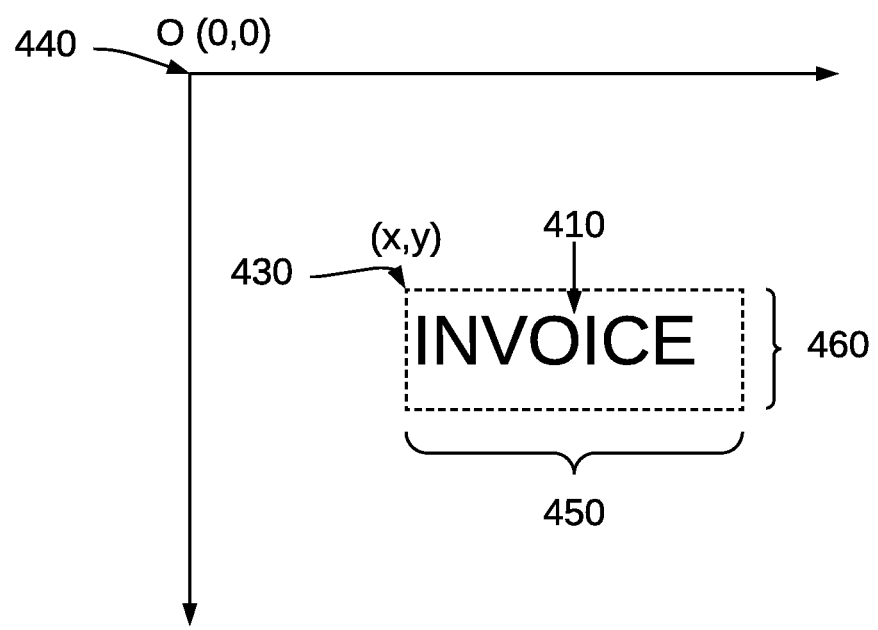
FIG. 4 is a diagram that illustrates a bounding box, in accordance with one or more embodiments.
Figure 6:
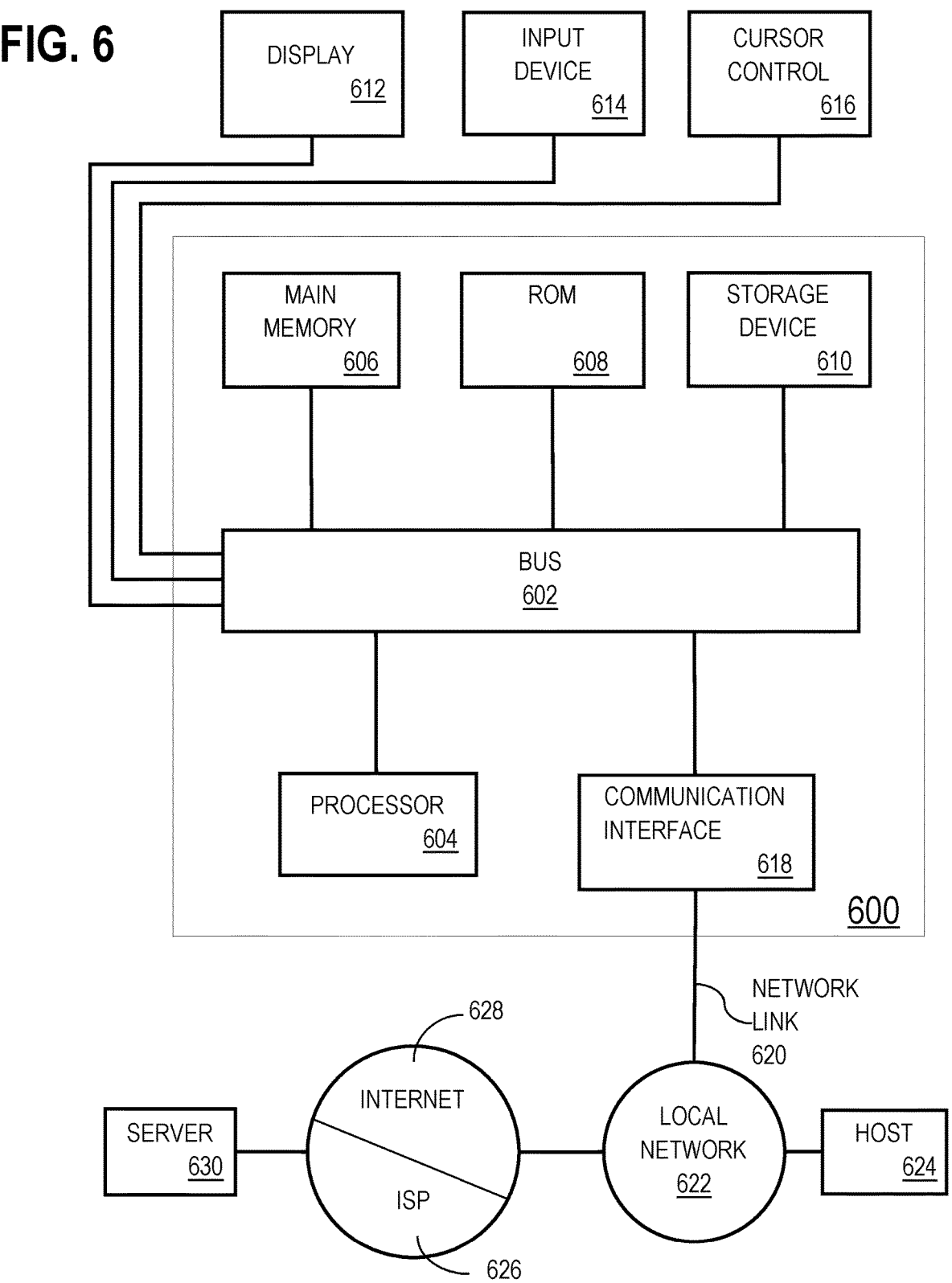
FIG. 6 is a block diagram that illustrates a computer system in accordance with one or more embodiments.

While the characters illustrated in FIG. 4 are all letters, it should be understood that numbers and punctuation could also be part of a phrase. For example, the period at the end of a sentence could be determined to belong to the last word of a sentence. A phrase can include both numbers and letters (for example, invoice number A123). A phrase can include numbers along with punctuation (such as a decimal indicator) or an indication of currency (such as a dollar sign, Euro symbol, Yen symbol, pound sign, peso symbol, and the like).

6. Example Table

Figure 5:
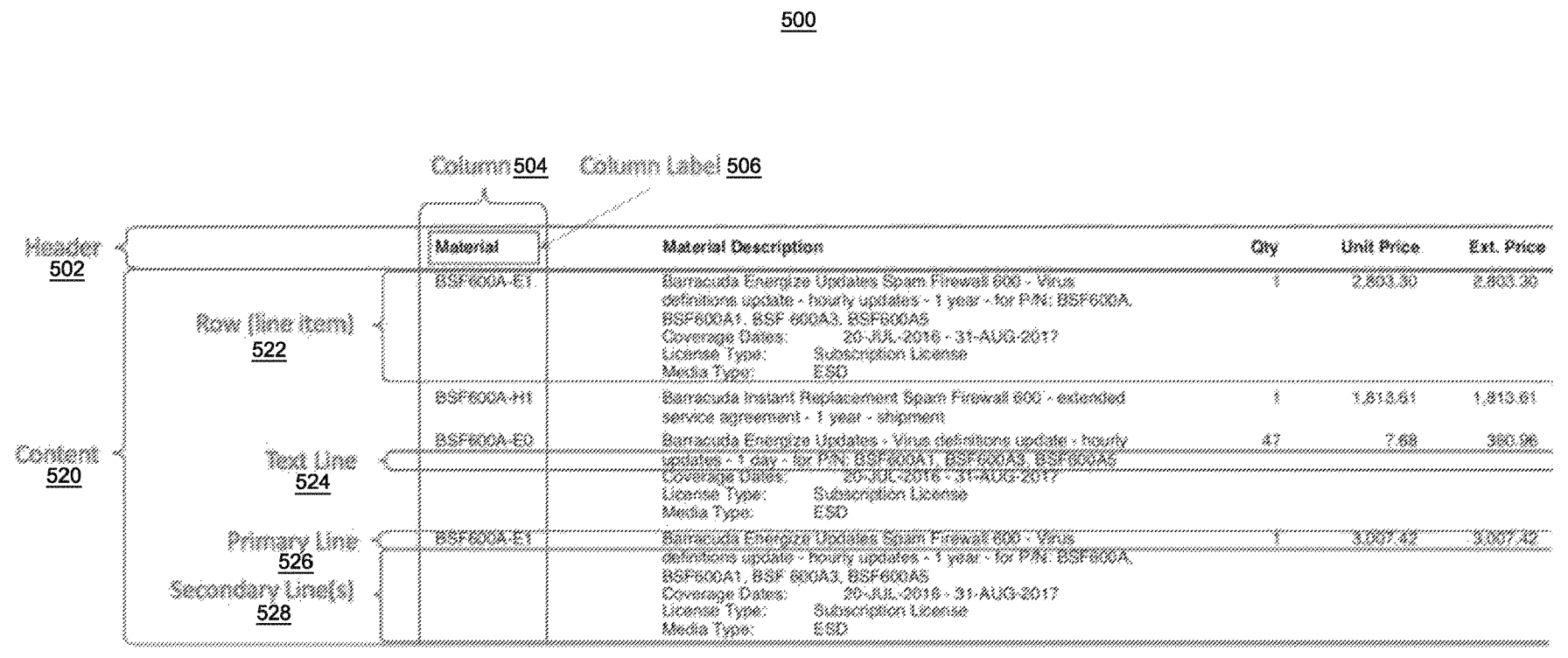

With reference to FIG. 5, an example table 500 of an invoice is presented, to illustrate the parts of a table. The table 500 includes various text lines 524 with characters that share a vertical position within the table. The first text line of the table 500 is a column header line 502 that includes column headers for each of the columns 504. The column headers are: Material, Material Description, Qty, Unit Price, and Ext. Price. Text lines 2-7 correspond to a single line item of the invoice. Primary line 526 and secondary lines 528 correspond to a same line item.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying an electronic document comprising a plurality of phrases, the plurality of phrases including:
        a first phrase having a first width defined by a first range of horizontal positions in the electronic document;
        a second phrase having a second width defined by a second range of horizontal positions in the electronic document;
        a third phrase having a third width defined by a third range of horizontal positions in the electronic document; and
        a fourth phrase having a fourth width defined by a fourth range of horizontal positions in the electronic document;
    detecting a plurality of phrases in the electronic document that are (a) on a same first text line and (b) correspond respectively to a plurality of known fields,
    wherein the plurality of phrases comprises the first phrase and the second phrase,
    wherein the first phrase corresponds to a first field of the plurality of known fields,
    responsive at least to determining that (a) the third range of horizontal positions in the electronic document at least partially overlaps the first range of horizontal positions in the electronic document and (b) a vertical position of the third phrase in the electronic document that is below a vertical position of the first phrase in the electronic document: storing a first value in association with a first field that corresponds to the first phrase;
    responsive at least to determining that (a) the fourth range of horizontal positions in the electronic document at least partially overlaps the second range of horizontal positions in the electronic document and (b) a vertical position of the fourth phrase in the electronic document is below a vertical position of the second phrase in the electronic document: storing a second value in association with a second field that corresponds to the second phrase;
    determining a mathematical relationship between values in a first column associated with the first phrase, a second column associated with the second phrase, and a third column in the electronic document;
    based on the mathematical relationship, determining that the third column corresponds to a third field of the plurality of known fields; and
    storing a third value in the third column in association with the third field.

2. The medium of claim 1, wherein the operations further comprise:
    responsive to determining that the plurality of phrases are (a) on the same first text line and (b) correspond respectively to the plurality of known fields:
    determining that the plurality of phrases correspond respectively to a plurality of column headers in a table in the electronic document.

3. The medium of claim 1, wherein the operations further comprise:
    determining that a second text line, immediately below the first text line, includes one or more digits;

responsive to determining that the second text line includes one or more digits, determining that the second text line comprises a set of values associated with the plurality of known fields;

storing each of the set of values in association with a corresponding field in the plurality of known fields.

4. The medium of claim 1, wherein the operations further comprise:

determining that a second text line, immediately below the first text line, does not include any digits;

responsive to determining that the second text line does not include any digits, determining that text in the second text line continues at least one column header of a plurality of column headers in the first text line.

5. The medium of claim 1, wherein the operations further comprise:

determining that a second text line, immediately below the first text line, is located within a threshold vertical distance threshold from the first text line;

responsive to determining that the second text line is located within the threshold vertical distance threshold from the first text line: determining that text in the second text line continues at least one column header of a plurality of column headers in the first text line.

6. The medium of claim 1, wherein the operations further comprise:

tagging each of the plurality of phrases as column headers.

7. The medium of claim 1, wherein determining that the plurality of phrases are on the same first text line comprises determining that each of the plurality of phrases have at least partially overlapping vertical positions in the electronic document.

8. The medium of claim 1, wherein the operations further comprise:

extracting data from the electronic document responsive to:

determining a number of the plurality of phrases, on the same first text line, that correspond to the plurality of known fields; and determining that the number exceeds a threshold value.

9. The medium of claim 1, wherein the operations further comprise:

writing a marked-up document that identifies the first text line as a column header line and a second text line as a line item with values corresponding to labels in the column header line.

10. The medium of claim 1, wherein the operations further comprise:

detecting a primary line of the first value and a secondary line of the first value based on one or more of:

(a) an alignment of the primary line of the first value;
(b) an indentation of the primary line of the first value;
(c) an alignment of the secondary line of the first value; or
(d) an indentation of the secondary line of the second value.

11. The medium of claim 1, wherein the operations further comprise:

identifying the first phrase and the second phrase as column headers in a table, wherein the column headers are detected on a first page of the electronic document, and wherein the operations further comprise:

responsive to detecting the same column headers, detected on the first page of the electronic document, on a second page of the electronic document: determining that the table extends from the first page to the second page of the electronic document;

extracting a fourth value from a portion of the table on the second page; and storing the fourth value in association with the same first field that corresponds to the first phrase.

12. The medium of claim 11, wherein the operations further comprise:

extracting a fifth value from a portion of the table on the second page based on horizontal position information, for a column comprising the fourth value, that was determined in relation to extracting the first value from the first page of the electronic document; and storing the fifth value in association with the first field that corresponds to the first phrase.

13. The medium of claim 1, wherein the operations further comprise:

responsive to determining that the plurality of phrases are (a) on the same first text line and (b) correspond respectively to the plurality of known fields: determining that the plurality of phrases correspond to column headers in a table in the electronic document;

tagging each of the plurality of phrases as column headers;

determining that a second text line, immediately below the first text line, includes one or more digits;

responsive to determining that the second text line includes one or more digits, determining that the second text line comprises a set of values associated with a first subset of fields;

storing each of the set of values in association with a corresponding field in the first subset of fields;

wherein determining that the plurality of phrases are on the same first text line comprises determining that the plurality of phrases have at least partially overlapping vertical positions in the electronic document;

wherein the operations further comprise extracting the data from the table is responsive to:

determining a number of the plurality of phrases that correspond respectively to the plurality of known fields; and determining that the number exceeds a threshold value; and writing a marked-up document that identifies the first text line as a column header line and the second text line as a line item with values corresponding to labels in the column header line.

14. The non-transitory computer readable medium of claim 1, wherein the plurality of phrases further includes a fifth phrase having a fifth width defined by a fifth range of horizontal positions in the electronic document, wherein the operations further comprise:

responsive to determining that the fifth range of horizontal positions in the electronic document does not even partially overlap the first range of horizontal positions in the electronic document: refraining from storing a third value, corresponding to the fifth phrase, in association with the first field that corresponds to the first phrase.

15. A method comprising:

identifying an electronic document comprising a plurality of phrases, the plurality of phrases including:

a first phrase having a first width defined by a first range of horizontal positions in the electronic document;

a second phrase having a second width defined by a second range of horizontal positions in the electronic document;

a third phrase having a third width defined by a third range of horizontal positions in the electronic document; and a fourth phrase having a fourth width defined by a fourth range of horizontal positions in the electronic document;

detecting a plurality of phrases in the electronic document that are (a) on a same first text line and (b) correspond respectively to a plurality of known fields, wherein the plurality of phrases comprises the first phrase and the second phrase, wherein the first phrase corresponds to a first field of the plurality of known fields, responsive at least to determining that (a) the third range of horizontal positions in the electronic document at least partially overlaps the first range of horizontal positions in the electronic document and (b) a vertical position of the third phrase in the electronic document that is below a vertical position of the first phrase in the electronic document: storing the first value in association with the first field that corresponds to the first phrase;

responsive at least to determining that (a) the fourth range of horizontal positions in the electronic document at least partially overlaps the second range of horizontal positions in the electronic document and (b) a vertical position of the fourth phrase in the electronic document is below a vertical position of the second phrase in the electronic document: storing a second value in association with a second field that corresponds to the second phrase;

determining a mathematical relationship between values in a first column associated with the first phrase, a second column associated with the second phrase, and a third column in the electronic document;

based on the mathematical relationship, determining that the third column corresponds to a third field of the plurality of known fields; and storing a third value in the third column in association with the third field, wherein the method is performed by at least one device including a hardware processor.

16. The method of claim 15, further comprising:

responsive to determining that the plurality of phrases are (a) on the same first text line and (b) correspond respectively to the plurality of known fields:

determining that the plurality of phrases correspond to column headers in a table in the electronic document.

17. The method of claim 15, further comprising: writing a marked-up document that identifies the first text line as a column header line and a second text line as a line item with values corresponding to labels in the column header line.

18. The method of claim 15, further comprising:

determining that a second text line, immediately below the first text line, includes one or more digits;

responsive to determining that the second text line includes one or more digits, determining that the second text line comprises a set of values associated with the plurality of known fields;

storing each of the set of values in association with a corresponding field in the plurality of known fields.

19. The method of claim 15, further comprising:

determining that a second text line, immediately below the first text line, does not include any digits;

responsive to determining that the second text line does not include any digits, determining that text in the second text line continues at least one column header of the column headers in the first text line.

20. The method of claim 15, further comprising:

determining that a second text line, immediately below the first text line, is located within a threshold vertical distance threshold from the first text line;

responsive to determining that the second text line is located within the threshold vertical distance threshold from the first text line: determining that text in the second text line continues at least one column header of the column headers in the first text line.

21. A system comprising:

at least one hardware processor;

the system storing instructions which, when executed by the at least one hardware processor, cause performance of operations comprising:

identifying an electronic document comprising a plurality of phrases, the plurality of phrases including:

a first phrase having a first width defined by a first range of horizontal positions in the electronic document;

a second phrase having a second width defined by a second range of horizontal positions in the electronic document;

a third phrase having a third width defined by a third range of horizontal positions in the electronic document; and a fourth phrase having a fourth width defined by a fourth electronic document;

detecting a plurality of phrases in the electronic document that are (a) on a same first text line and (b) correspond respectively to a plurality of known fields, wherein the plurality of phrases comprises the first phrase and the second phrase, wherein the first phrase corresponds to a first field of the plurality of known fields, responsive at least to determining that (a) the third range of horizontal positions in the electronic document at least partially overlaps the first range of horizontal positions in the electronic document and (b) a vertical position of the third phrase in the electronic document is below a vertical position of the first phrase in the electronic document: storing a first value in association with a first field that corresponds to the first phrase;

responsive at least to determining that (a) the fourth range of horizontal positions in the electronic document at least partially overlaps the second range of horizontal positions in the electronic document and (b) a vertical position of the fourth phrase in the electronic document is below a vertical position of the second phrase in the electronic document: storing a second value in association with a second field that corresponds to the second phrase;

determining a mathematical relationship between values in a first column associated with the first phrase, a second column associated with the second phrase, and a third column in the electronic document;

based on the mathematical relationship, determining that the third column corresponds to a third field of the plurality of known fields; and storing a third value in the third column in association with the third field.

22. The system of claim 21, wherein the operations further comprise:

responsive to determining that the plurality of phrases are (a) on the same first text line and (b) correspond respectively to the plurality of known fields:

determining that the plurality of phrases correspond respectively to a plurality of column headers in a table in the electronic document.

\* \* \* \* \*